United States Patent
De Graaf et al.

(10) Patent No.: US 11,794,432 B2
(45) Date of Patent: *Oct. 24, 2023

(54) TURN-UP SECTION AND TIRE BUILDING DRUM COMPRISING SAID TURN-UP SECTION

(71) Applicant: VMI Holland B.V., Epe (NL)

(72) Inventors: Martin De Graaf, Epe (NL); Dave Papot, Epe (NL)

(73) Assignee: VMI HOLLAND B.V.

( * ) Notice: Subject to any disclaimer, the term of this patent is extended or adjusted under 35 U.S.C. 154(b) by 288 days.

This patent is subject to a terminal disclaimer.

(21) Appl. No.: 17/227,080

(22) Filed: Apr. 9, 2021

(65) Prior Publication Data

US 2021/0221083 A1  Jul. 22, 2021

Related U.S. Application Data

(62) Division of application No. 16/470,478, filed as application No. PCT/NL2017/050777 on Nov. 27, 2017, now Pat. No. 11,001,023.

(30) Foreign Application Priority Data

Dec. 16, 2016 (NL) ..................................... 2018011

(51) Int. Cl.
*B29D 30/32* (2006.01)
*B29D 30/24* (2006.01)
*B29D 30/26* (2006.01)

(52) U.S. Cl.
CPC ......... *B29D 30/247* (2013.01); *B29D 30/245* (2013.01); *B29D 30/32* (2013.01);
(Continued)

(58) Field of Classification Search
CPC ........ B29D 30/18; B29D 30/28; B29D 30/32; B29D 2030/3221; B29D 2030/3257; B29D 2030/3264
See application file for complete search history.

(56) References Cited

U.S. PATENT DOCUMENTS

| 2,838,091 | A | * | 6/1958 | Kraft | ...................... B29D 30/32 |
| | | | | | 156/413 |
| 3,674,604 | A | | 7/1972 | Gazuit | .......................... 156/415 |

(Continued)

FOREIGN PATENT DOCUMENTS

| CN | 1681642 | | 10/2005 | ............. B29D 30/32 |
| DE | 1262581 B | * | 3/1968 | ..... B29D 2030/3264 |

(Continued)

OTHER PUBLICATIONS

Machine translation for DE 1262581; patent document published Mar. 7, 1968.*

(Continued)

*Primary Examiner* — Geoffrey L Knable
(74) *Attorney, Agent, or Firm* — HAYES SOLOWAY P.C.

(57) ABSTRACT

A turn-up section for a tire building drum, includes a plurality of turn-up arms distributed circumferentially about a central axis and an arm support for supporting the turn-up arms with respect to a base, wherein the turn-up arms are rotatable with respect to the arm support from an arms-down position towards an arms-up position in response to the movement of the arm support in an arm drive direction. Each turn-up arm comprises a hinge pin for rotatably coupling the respective turn-up arm to the arm support. The arm support includes a hinge seat for removably receiving the hinge pin of the respective turn-up arm. The hinge pin is retained in the hinge seat by one or more biasing members. The hinge pin of the turn-up arm is removable from the hinge seat in a (Continued)

radial direction with respect to the central axis by counteracting the bias of the one or more biasing members.

6 Claims, 12 Drawing Sheets

(52) U.S. Cl.
CPC ...... *B29D 30/26* (2013.01); *B29D 2030/3214* (2013.01); *B29D 2030/3228* (2013.01); *B29D 2030/3264* (2013.01)

(56) References Cited

U.S. PATENT DOCUMENTS

| | | | |
|---|---|---|---|
| 3,740,293 A | 6/1973 | Jones et al. | 156/415 |
| 3,867,231 A | 2/1975 | Casey | 156/415 |
| 4,131,500 A | 12/1978 | Wilde et al. | 156/131 |
| 4,220,494 A | 9/1980 | Kawaida et al. | 156/415 |
| 4,510,012 A | 4/1985 | Kawaida et al. | 156/415 |
| 5,618,374 A | 4/1997 | Byerley | 156/418 |
| 7,288,160 B2 | 10/2007 | Roedseth et al. | 156/132 |
| 8,861,471 B2 | 10/2014 | Parkvall et al. | H04W 72/04 |
| 9,662,847 B2 | 5/2017 | Painter | B29D 30/26 |
| 9,724,886 B2 | 8/2017 | Bignogno et al. | B29D 30/12 |
| 11,001,023 B2* | 5/2021 | De Graaf | B29D 30/247 |
| 2002/0124968 A1 | 9/2002 | Gutknecht et al. | 156/402 |
| 2003/0047284 A1 | 3/2003 | Akiyama | 156/415 |
| 2003/0168144 A1 | 9/2003 | Weaver | 152/415 |
| 2006/0102272 A1 | 5/2006 | Iyanagi | 156/132 |
| 2009/0133842 A1 | 5/2009 | Grolleman et al. | 156/415 |
| 2009/0266490 A1 | 10/2009 | De Graaf | 156/416 |
| 2012/0037298 A1 | 2/2012 | De Graaf | 156/110.1 |
| 2013/0139971 A1* | 6/2013 | Morisaki | B29D 30/18 156/402 |
| 2013/0160951 A1 | 6/2013 | De Graaf | 156/414 |

FOREIGN PATENT DOCUMENTS

| | | | |
|---|---|---|---|
| EP | 1547757 | 6/2005 | B29D 30/32 |
| GB | 1532960 | 11/1978 | B29H 17/14 |
| JP | S5183680 | 7/1976 | B29C 67/00 |
| JP | S 5463184 | 5/1979 | B29H 17/16 |
| JP | 2011504429 | 2/2011 | B29D 30/72 |
| JP | 2011525447 | 9/2011 | B29D 30/24 |
| JP | 2011525748 | 9/2011 | H04Q 72/04 |
| JP | 2014514978 | 6/2014 | B29D 30/24 |
| SU | 286843 | 5/1986 | B29D 30/24 |
| WO | WO2009070020 | 6/2009 | B29D 30/24 |
| WO | WO2011019280 | 2/2011 | B29D 30/24 |

OTHER PUBLICATIONS

Chinese Official Action issued in corresponding Chinese Patent Application Serial No. 2017800833835, dated Jan. 5, 2021 (with English Machine Translation) (22 pages).
Decision issued in related Russian Patent Application Serial No. 2019122138/05, dated Mar. 29, 2021, 30 pages.
International Search Report and Wiitten Opinion issued in application No. PCT/NL/2017/050777, dated Aug. 8, 2018 (11 pgs).
Japanese Decision to Grant issued in corresponding Japanese Patent Application Serial No. 2018-551756, dated Apr. 21, 2020 (with English Machine Translation) (5 pages).
Japanese Office Action (W/translation) issued in application No. 2018-551756, dated Sep. 20, 2019 (9 pgs).

* cited by examiner

TURN-UP SECTION AND TIRE BUILDING DRUM COMPRISING SAID TURN-UP SECTION

CROSS REFERENCE TO RELATED APPLICATION

This application is a divisional application based on U.S. patent application Ser. No. 16/470,478 filed Jun. 17, 2019, the contents of which are incorporated herein by reference.

BACKGROUND

The invention relates to a turn-up section and a tire building drum comprising said turn-up section.

When the turn-up arms of a known tire building drum are rotated radially outwards into an extreme arms-up position that is higher than the normal arms-up position, the turn-up arms may cause damage to the tire building drum in such an extreme arms-up position.

It is an object of the present invention to provide a turn-up section and a tire building drum comprising said turn-up section, wherein damage to the tire building machine can be prevented.

SUMMARY OF THE INVENTION

According to a first aspect, the invention provides a turn-up section for a tire building drum, comprising a plurality of turn-up arms distributed circumferentially about a central axis and an arm support for supporting said turn-up arms with respect to a base, wherein the turn-up arms are rotatable with respect to the arm support from an arms-down position towards an arms-up position in response to the movement of the arm support in an arm drive direction, wherein the arm support comprises a hinge seat for removably receiving the respective turn-up arm, wherein the respective turn-up arm is retained in the hinge seat by one or more biasing members, wherein the respective turn-up arm is removable from the hinge seat in the radial direction by counteracting the bias of the one or more biasing members. Hence, the turn-up arms can be removed from their respective hinge seats once a force is generated on the turn-up arms that is opposite to and exceeds the biasing force.

More in particular, each turn-up arm is provided with a cam surface that is arranged for lifting the respective turn-up arm out of the respective hinge seat when the respective turn-up arm is rotated radially outwards beyond the normal arms-up position. Hence, when the turn-up arms are rotated into an extreme arms-up position, the turn-up arms can automatically be lifted out of their respective hinge seats, thereby preventing damage to the rest of the tire building machine.

In a further embodiment each turn-up arm comprises a hinge pin for rotatable coupling the respective turn-up arm to the arm support, wherein the hinge pin is removable received in the hinge seat and retained by the one or more biasing members in said hinge seat, wherein the hinge pin of the respective turn-up arm is removable from the hinge seat in the radial direction by counteracting the bias of the one or more biasing members.

In a further embodiment the cam surface is arranged for lifting the hinge pin out of the respective hinge seat when the respective turn-up arm is rotated radially outwards beyond the normal arms-up position.

According to a second aspect, the invention provides a first drum half for together with a second drum half forming a tire building drum, wherein the first drum half comprises the aforementioned turn-up section.

According to a third, unclaimed aspect, the invention provides a first drum half for together with a second drum half forming a tire building drum of a tire building machine, wherein the tire building machine comprises a rotation axis and a drum shaft extending along the rotation axis for supporting said first drum half and said second drum half on opposite sides of a center of the tire building drum, wherein the tire building machine further comprises a first drive member and a second drive member movable in an axial direction parallel to the rotation axis with respect to the first drum half, wherein the first drum half comprises:

a base for mounting the first drum half to the drum shaft, wherein the base has a central axis that is arranged to coincide with the rotation axis, wherein the base is arranged to be movable over the drum shaft in the axial direction parallel to said central axis; and a crown-up section comprising a plurality of crown segments distributed circumferentially about said central axis and movable with respect to the base in a crown-up direction outwards in a radial direction with respect to the central axis from a crown-down position towards a crown-up position;

wherein the first drum half comprises a displacement member for displacing the crown segments in the crown-up direction, wherein the first drum half further comprises a first coupling member for coupling the first drive member to the base to drive the movement of the base in the axial direction and a second coupling member for coupling the second drive member to the displacement member to drive the displacement of the crown segments in the crown-up direction.

By using the first coupling member and the second coupling member to operationally couple the base and the displacement member, respectively, to the drive members of the tire building machine inside the drum shaft, other driving mechanisms, such as a spindle or a push-pull rod, can be used to synchronously drive the drum halves. A mechanical transmission with spindles and/or push-pull rods can be considerably more accurate and direct than for example pneumatically driven drive mechanisms. In particular synchronous control of the crown segments of both drum halves, and thereby accurate control of the center section of the tire building drum, can be obtained.

In an embodiment thereof the first drive member and the second drive member are movable in the axial direction inside the drum shaft, wherein the first coupling member and the second coupling member are arranged for coupling the first drive member and the second drive member to the base and the displacement member, respectively, from within the drum shaft. Hence, the first drum half can be operated by using drive members that are not part of the first drum half and that are located inside the drum shaft.

In a further embodiment the first coupling member and the second coupling member are arranged to be independently movable. Therefore, the axial displacement of the base and the radial displacement of the crown segments can be controlled individually and/or independently.

In a further embodiment the displacement member is movable in a crown drive direction parallel to the axial direction. Hence, the displacement member can be moved together and/or in unison with the second drive member inside the drum shaft.

In a further embodiment thereof the first drum half is arranged to be placed on the drum shaft such that the crown drive direction is directed away from the center of the tire building drum. Hence, the crown segments can be displaced in the crown-up direction by moving the displacement member in the crown drive direction away from the center of the tire building drum.

In a further embodiment thereof the crown-up section comprises a crown support for supporting the crown segments with respect to the base and a crown drive for displacing the crown segments with respect to the crown support, wherein the displacement member is arranged for driving the crown drive in the crown drive direction and wherein the crown drive is arranged for converting the movement of the displacement member in the crown drive direction into the displacement of the crown segments in the crown-up direction. Hence, an axially movable drive member within the drum shaft can be used to actuate the radial displacement of the crown segments in the crown-up direction.

In a further embodiment thereof the displacement member is provided with a crown drive surface facing in the crown drive direction for contacting the crown drive in said crown drive direction and for displacing the crown drive in the crown drive direction through said contact. By merely contacting the crown drive, the displacement member can be moved independently and/or freely with respect to the crown drive in an axial direction opposite to the crown drive direction, e.g. to drive other operations of the tire building drum such as a turn-up operation.

In a further embodiment thereof the crown support and the crown drive comprises two opposite drive surfaces, at least one of which is inclined with respect to the other, and wherein each crown segment comprises a wedge that is received between the opposite drive surfaces, wherein the crown drive is movable in the crown drive direction towards the crown support for forcing the wedge outwards in the crown-up direction. The interaction between the wedge and the opposite drive surfaces is a simple yet effective and accurate mechanism to convert the axial movement of the displacement member into a radial movement or a substantially radial movement of the crown segments.

In a further embodiment thereof the crown-up section comprises a biasing member for biasing the crown drive away from the crown support in the axial direction. The bias allows for the crown segments to return to the crown-down position.

In a further embodiment thereof the first drum half comprises a locking member that is arranged for locking the crown drive in the axial direction with respect to the base. By locking the crown drive, it can be ensured that the crown segments remain in the crown-up position during other operations of the tire building drum, e.g. during a shaping operation or a turn-up operation.

In an embodiment thereof the crown drive comprises a locking aperture, wherein the locking member is a locking pin that is arranged to engage the locking aperture. The locking pin can simply be moved into the locking aperture to lock the crown drive.

In an embodiment thereof the locking pin is pneumatically driven between a locking position and release position, wherein the first drum half is provided with a flow rate sensor for detecting an interruption of the air flow indicative of the locking pin being in one of the locking position and the release position. As the locking pin may not be visible from the outside of the tire building drum, said detection can be useful to determine the actual position of the locking pin.

In a further embodiment thereof the crown-up segments are located at one side of the displacement member and the locking member is located at an opposite side of the displacement member with respect to the crown-up segments, wherein the crown drive extends from the crown segments at the one side of the displacement member up to the locking member at the opposite side of the displacement member. Hence, the crown segments can be locked by a locking member that is located at an opposite side of the displacement member with respect to the crown segments to be locked.

In a further embodiment thereof the displacement member is arranged to be movable in the axial direction with respect to the locked crown drive. Hence, the displacement member can be moved independently and/or freely with respect to the locked crown drive to drive other operations of the tire building drum, e.g. a turn-up In a further embodiment the first drum half further comprises a bead-lock section that is located in the axial direction between the crown-up section and the turn-up section, wherein the bead-lock section comprises a plurality of bead-lock members distributed circumferentially about said central axis, a bead-lock support for supporting the bead-lock members with respect to the base and a bead-lock drive for moving the bead-lock members with respect to the bead-lock support in the radial direction between a release position and a bead-lock position, wherein the bead-lock support is fixed with respect to the base in the axial direction. Hence, the crown drive can moved and/or locked relative to the base and the bead-lock support associated with said base.

In an embodiment thereof the bead-lock section comprises a bead-lock seal which is arranged to extend over and seal the bead-lock member in an air-tight or substantially air-tight manner, wherein the bead-lock seal comprises a first end that is arranged to be mounted in an air-tight or substantially air-tight manner to the crown-up section and a second end that is arranged to be mounted in an air-tight or substantially air-tight manner in between the bead-lock member and a mounting body directly adjacent to the bead-lock member, wherein the bead-lock seal is arranged to slide along the mounting body when the bead-lock member is moved between the release position and the bead-lock position. The sliding can prevent that the air-tight seal between the bead-lock seal and the mounting body is interrupted when the bead-lock member is moved in the radial direction.

Preferably, the mounting body is provided with a ridge at its radially outer side to retain the bead-lock seal in the radial direction. More preferably, the bead-lock seal is provided with a flange that faces towards the ridge in the radial direction and that is arranged to hook behind said ridge in the radial direction. These features can further prevent the release of the bead-lock seal from the mounting body.

According to a fourth, unclaimed aspect, the invention provides a tire building machine comprising the aforementioned first drum half and a second drum half for together forming a tire building drum, wherein the tire building machine has a rotation axis defining an axial direction and a drum shaft extending in said axial direction for supporting said first drum half and said second drum half on opposite sides of a center of the tire building drum, wherein the tire building machine further comprises a drive system with a first drive member and a second drive member which are arranged to be operationally coupled to the first drum half and a third drive member and a fourth drive member which are arranged to be operationally coupled to the second drum half for operating said drum halves.

Hence, two of the drive members can be used to drive the displacement of the base and two of the drive members can be used to drive the displacement member to displace the crown segments in each of the drum halves.

In an embodiment thereof the drive members are push-pull rods. Preferably, at least some of said push-pull rods are hollow to allow concentric placement of all said push-pull rods with respect to the rotation axis, one inside the other, inside the drum shaft. A mechanical transmission through with push-pull rods can be considerably more accurate and direct than for example pneumatically driven drive mechanisms. In particular synchronous control of the crown segments of both drum halves, and thereby accurate control of the center section of the tire building drum, can be obtained.

In a further embodiment thereof the drive system further comprises a set of spindles and flight nuts for separately connecting to and driving each push-pull rod. Hence, each push-pull rod can be separately driven to obtain synchronous operation of the tire building drum.

In a further embodiment thereof the drive system is arranged for displacing the arm support such that each turn-up arm is turned-up into an intermediate position between the arms-down position and the arms-up position. In said intermediate position, the turn-up arms can support one or more layers of the green tire during their application on the circumferential surface of the tire building drum. Said intermediate position may also be used to provide additional support for tire layers and/or the bead at the bead-lock member in the axial direction in case of high-pressure inflation of said tire layers, e.g. for truck tires.

In a further embodiment thereof the tire building drum comprises a center section at the center between the first drum half and the second drum half, wherein the crown-up sections of both drum halves are arranged for supporting said center section. By controlling said drum halves accurately and/or synchronously in accordance with one or more of the aforementioned embodiments, the center section can be moved more accurately and tire uniformity of the tire layers supported thereon can be improved.

In a further embodiment thereof the tire building drum is removably arranged on the drum shaft of the tire building machine so as to be interchangeable with another tire building drum of a different type. Hence, different tire building operations can be carried out with different tire building drums on the same tire building machine.

In an optional embodiment the drive system is arranged for displacing the crown segments into a shoulder position for flat carcass building. Hence, both a flat carcass building method as a crown carcass building method can be performed on the same tire building machine without interchanging the drum halves of the tire building drum. According to a fifth, unclaimed aspect, the invention provides a method for operating the aforementioned tire building machine, wherein the method comprises the steps of:
coupling the first drive member to the base to drive the movement of the base in the axial direction; and
coupling the second drive member to the displacement member to drive the displacement of the crown segments in the crown-up direction.

In an embodiment thereof the method further comprises the step of locking the crown drive in the axial direction with respect to the base when the crown segments are in the crown-up position.

Again, by using the first coupling member and the second coupling member to operationally couple the base and the displacement member, respectively, to the drive members of the tire building machine inside the drum shaft, other driving mechanisms, such as a spindle or a push-pull rod, can be used to synchronously drive the drum halves.

In an embodiment of the method the first drive member and the second drive member are moved in the axial direction inside the drum shaft, wherein the first coupling member and the second coupling member couple the first drive member and the second drive member to the base and the displacement member, respectively, from within the drum shaft. Hence, the first drum half can be operated by using drive members that are not part of the first drum half and that are located inside the drum shaft.

In another embodiment of the method the first coupling member and the second coupling member are independently moved by the first drive member and the second drive member, respectively. Therefore, the axial displacement of the base and the radial displacement of the crown segments can be controlled individually and/or independently.

In a further embodiment of the method, the drive members are push-pull rods, wherein each push-pull rod is separately driven. A mechanical transmission through with push-pull rods can be considerably more accurate and direct than for example pneumatically driven drive mechanisms. In particular synchronous control of the crown segments of both drum halves, and thereby accurate control of the center section of the tire building drum, can be obtained.

In an embodiment thereof the first drum half is further provided with a turn-up section comprising a plurality of turn-up arms distributed circumferentially about said central axis and an arm support for supporting said turn-up arms with respect to the base, wherein the method comprises the step of using the displacement member to move the arm support in an arm drive direction opposite to the crown drive direction and rotating the turn-up arms with respect to the arm support from an arms-down position towards an arms-up position in response to the movement of the arm support in the arm drive direction. Hence, two operations of the tire building drum can be driven by the same displacement member. In particular, the crown-up can be driven by moving the displacement member in the crown drive direction, while the turn-up can be driven by moving the displacement member in the opposite arm drive direction. This can significantly reduce the number of drive members required for operating the tire building drum.

In a further embodiment of the method, the arm support is displaced such that each turn-up arm is turned-up into an intermediate position between the arms-down position and the arms-up position. In said intermediate position, the turn-up arms can support one or more layers of the green tire during their application on the circumferential surface of the tire building drum. Said intermediate position may also be used to provide additional support for tire layers and/or the bead at the bead-lock member in the axial direction in case of high-pressure inflation of said tire layers, e.g. for truck tires.

In a crown carcass building embodiment of the method, the turn-up arms are moved into the arms-up position after the crown segments are displaced into the crown-up position and prior to a shaping operation at the center of the drum.

In an alternative flat carcass building embodiment of the method, the crown segments are displaced into a shoulder position for flat carcass building, wherein a shaping operation is performed at the center of the drum after the crown segments are in the shoulder position and wherein the turn-up arms are moved into the arms-up position after the shaping operation has been completed.

Hence, both a flat carcass building method as well as a crown carcass building method can be performed on the same tire building machine without interchanging the drum halves of the tire building drum.

In a further embodiment of the method, the tire building drum comprises a center section at the center between the first drum half and the second drum half, wherein the crown-up sections of both drum halves are arranged for synchronously moving said center section in the radial direction. By controlling said drum halves accurately and/or synchronously in accordance with one or more of the aforementioned embodiments, the center section can be moved more accurately and tire uniformity of the tire layers supported thereon can be improved.

In a further embodiment of the method, the tire building drum is removably arranged on the drum shaft of the tire building machine, wherein the method comprises the step of interchanging the tire building drum with a tire building drum of a different type. Hence, different tire building operations can be carried out with different tire building drums on the same tire building machine.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-8 show a tire building drum 1, in particular a crown drum, for single stage tire building. Hence, said tire building drum 1 is arranged for expanding and contracting in both an axial direction A and a radial direction R.

Figure 1:
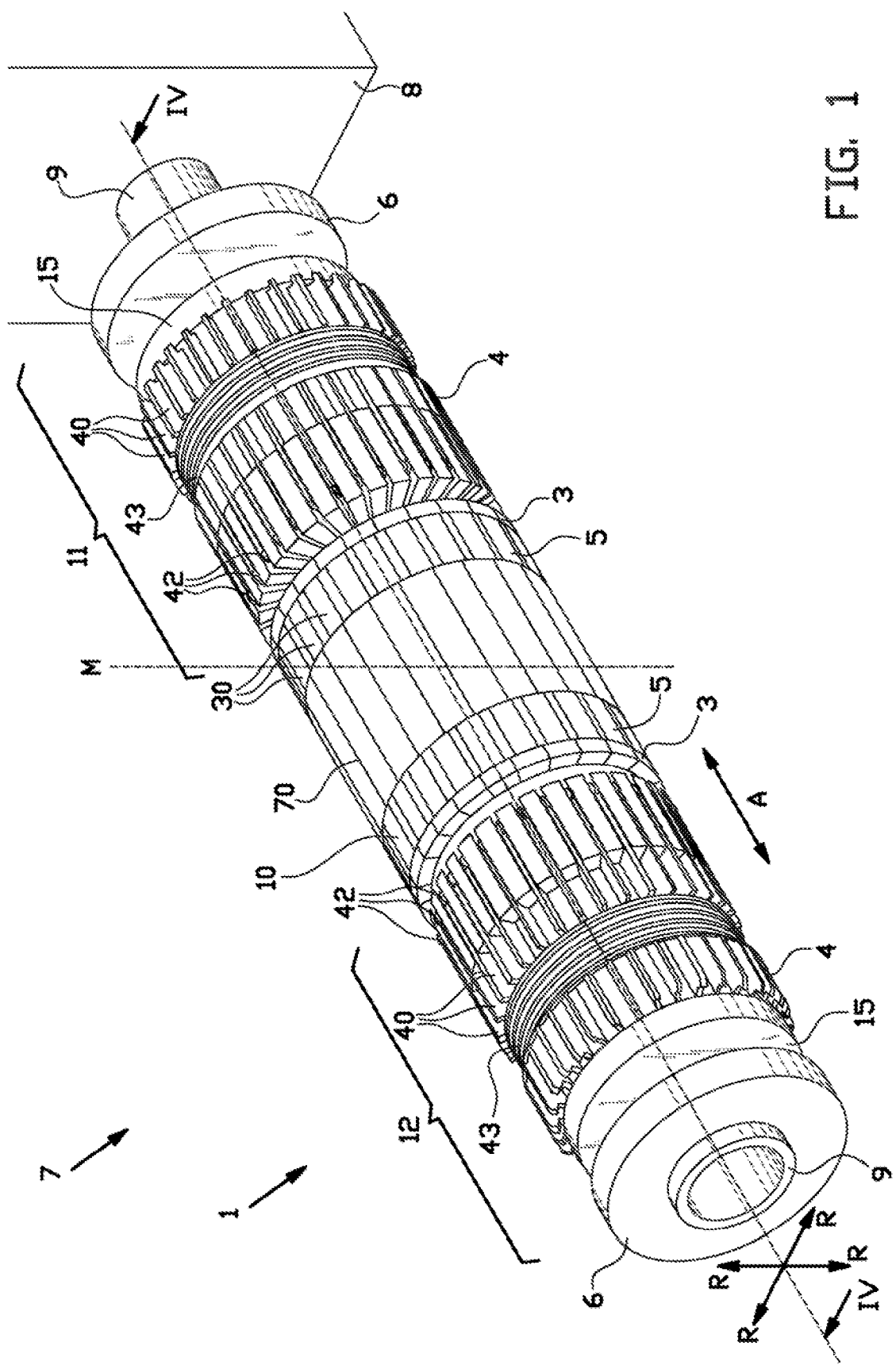
FIG. 1 shows an isometric view of a tire building machine with a tire building drum and a drive system according to the invention, wherein the tire building drum is in a crown-down position.
Figure 2:
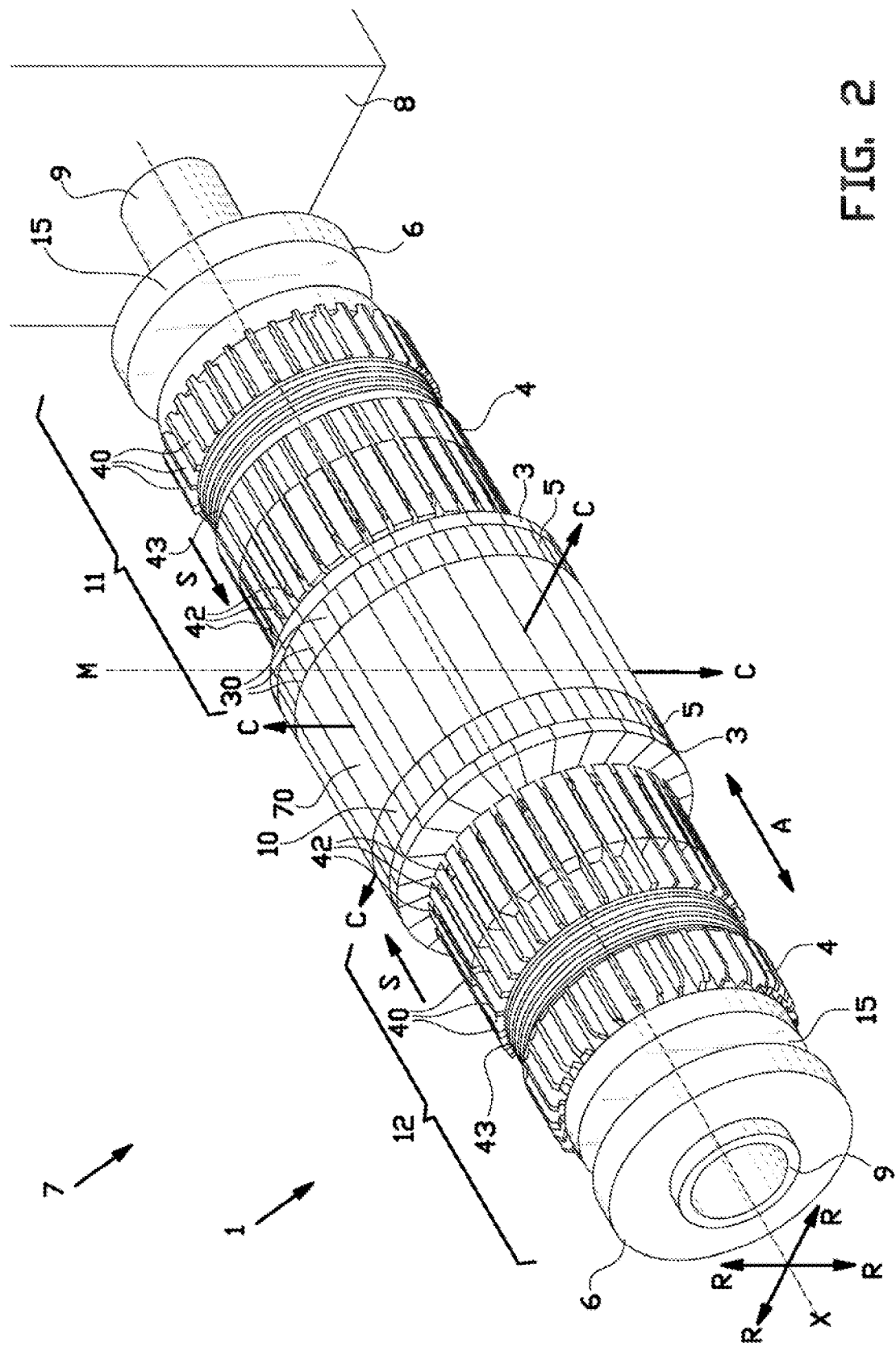
FIG. 2 shows an isometric view of the tire building machine according to FIG. 1 with the tire building drum in a crown-up position.
Figure 3:
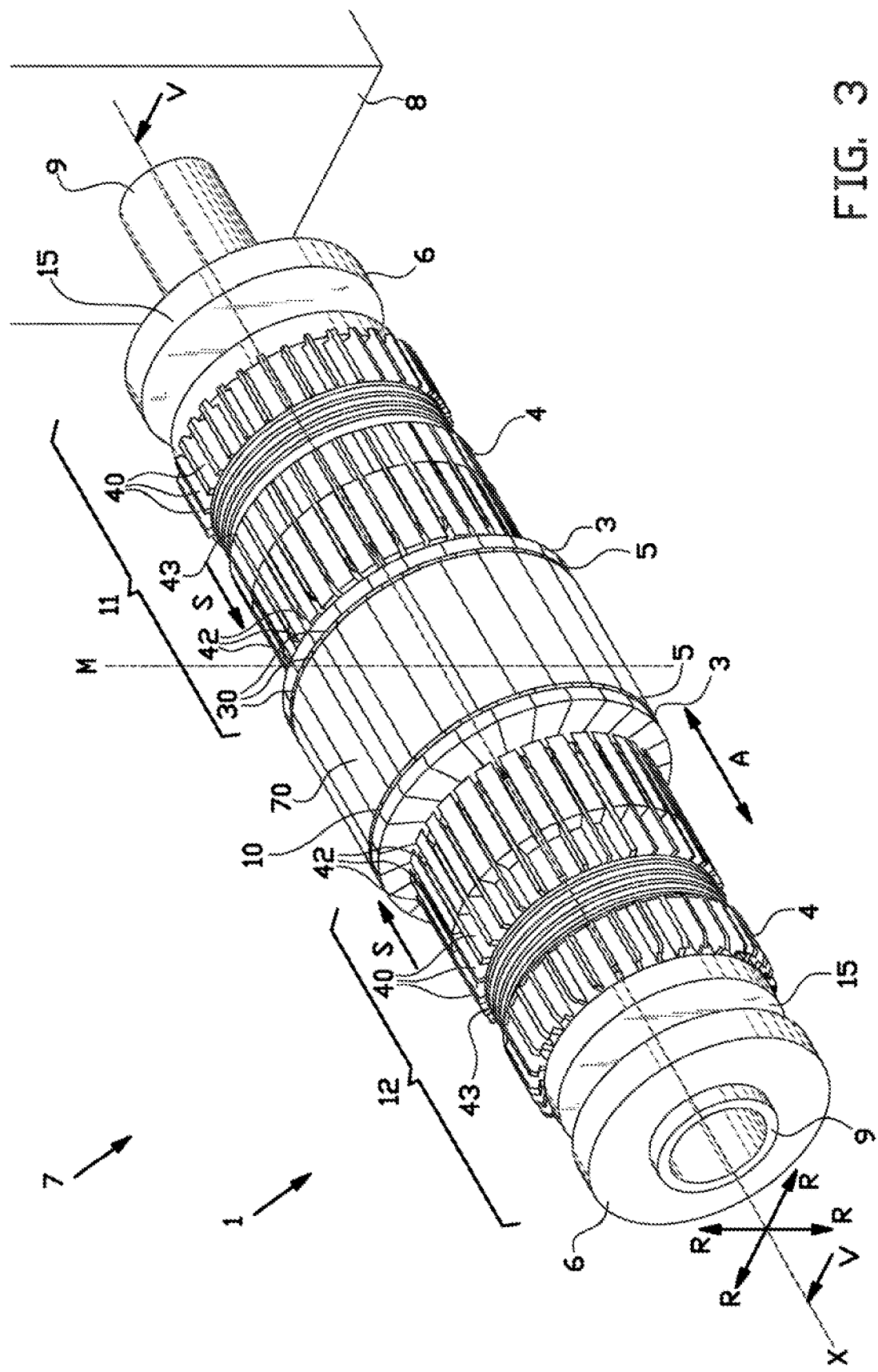
FIG. 3 shows an isometric view of the tire building machine according to FIG. 1 with the tire building drum in a shaping position.
Figure 9:
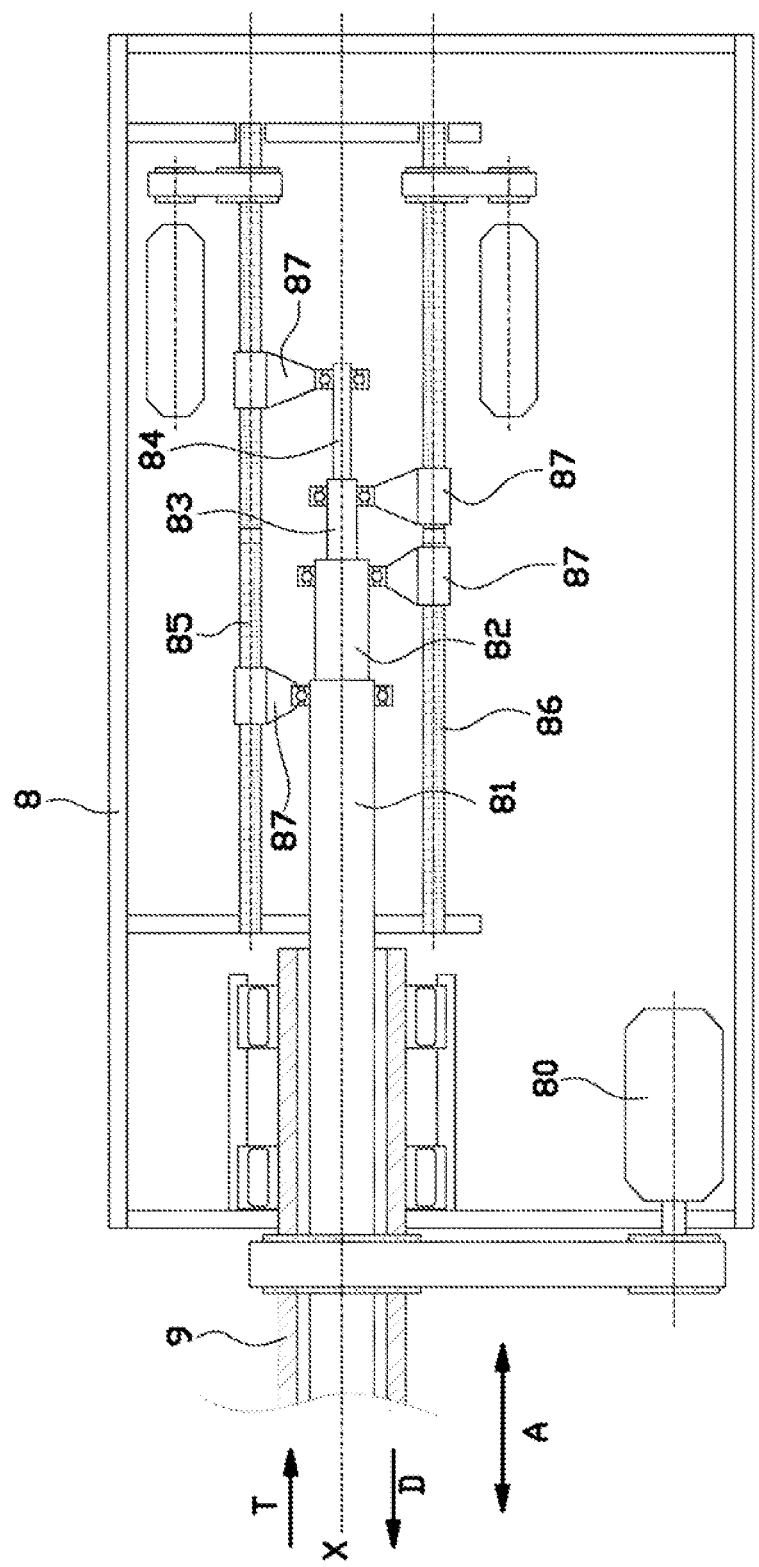
FIG. 9 shows a cross section of the drive system according to FIG. 1 for driving the movements of the tire building drum between various positions.

As shown in FIGS. 1, 2 and 3, the tire building drum 1 comprises a first drum half 11 and a said second drum half 12 that together form the tire building drum 1. In particular, the first drum half 11 and the second drum half 12 form and/or define a circumferential surface 10 of the tire building drum 1 that is arranged for receiving and/or supporting one or more layers, e.g. carcass layers, body plies, breaker plies, sidewalls and/or treads, for building a green or unvulcanised tire (not shown). The tire building drum 1 is an exchangeable part of a tire building machine 7. The tire building machine 7 comprises a drive system 8 and a drum shaft 9 extending in the axial direction A from the drive system 8 and defining a rotation axis X. The drum shaft 9 is arranged for supporting the first drum half 11 and the second drum half 12 on opposite sides of a center M of the tire building drum 1. At the center M, the tire building drum 1 is typically provided with a center deck 70 for supporting the tire layers between the drum halves 11, 12. The drive system 8 comprises a rotation drive 80 for driving the drum shaft 9, and the drum halves 11, 12 supported thereon, in a rotation about the rotation axis X. As shown in FIG. 9, the drive system 8 comprises a first drive member 81 and a second drive member 82 which are arranged to be operationally coupled to the first drum half 11 and a third drive member 83 and a fourth drive member 84 which are arranged to be operationally coupled to the second drum half 12 for operating said drum halves 11, 12 in a manner that will be described in more detail hereafter. The drive members 81-84 are linearly moveable in the axial direction A at or parallel to said rotation axis X.

The drive members 81-84 are preferably push-pull rods 81-84, known per se from WO 2011/019280 A1. At least some of said push-pull rods 81-84 are hollow to allow concentric placement of all said push-pull rods 81-84 with respect to the rotation axis X, one inside the other, inside the drum shaft 9. The push-pull rod 81 that connects to one of the drum halves 11, 12 at a position closest to the drive system 8 is located on the outside, whilst the push-pull rods 81-84 that connect to the drum halves 11, 12 at positions further away from the drive system 8 are located more inwards in sequence. The drive system 8 further comprises a set of spindles 85, 86 and flight nuts 87, also known per se from WO 2011/019280 A1, for separately connecting to and driving each push-pull rod 81-84. The drive mechanism as disclosed in WO 2011/019280 A1 allows for directly, accurately and/or synchronously driving the drum halves 11, 12 of the tire building drum 1 of the present invention, e.g. with the use of servo motors. The mechanical transmission through the spindles 85, 86, the flight nuts 87 and the push-pull rods 81-84 is considerably more accurate and direct than for example pneumatically driven drive mechanisms.

It is further noted that the tire building drum 1 according to the present invention is removably arranged on the drum shaft 9 of the tire building machine 7 so as to be interchangeable with other tire building drums, e.g. the known tire building drum as disclosed in WO 2011/019280 A1. Hence, various single stage tire building operations, can be performed on the same tire building machine 7 simply by interchanging one tire building drum for another. Examples of tire building operations to be performed on the same tire building machine 7 include, but are not limited to: one ply up; one ply up and one ply down; two ply up; two ply up and one ply down; and any of the aforementioned operations to achieve a tread over sidewall (TOS) configuration, a sidewall over tread (SOT) configuration or a configuration with a run-flat insert (RFI).

As shown in FIGS. 1, 2 and 3, the drum halves 11, 12 of the tire building drum 1 are arranged to be operated mirror-symmetrically about the center M of the tire building drum 1. Hence, the drum halves 11, 12—apart from being mirror-symmetrical to each other—are identical or substantially identical. The operation of said drum halves 11, 12 will be elucidated further on the basis of FIGS. 4-8 and with reference to the first drum half 11 only. The one skilled in the art will however appreciate that the description of the first drum half 11 applies mutatis mutandis to the second drum half 12.

Figure 4:
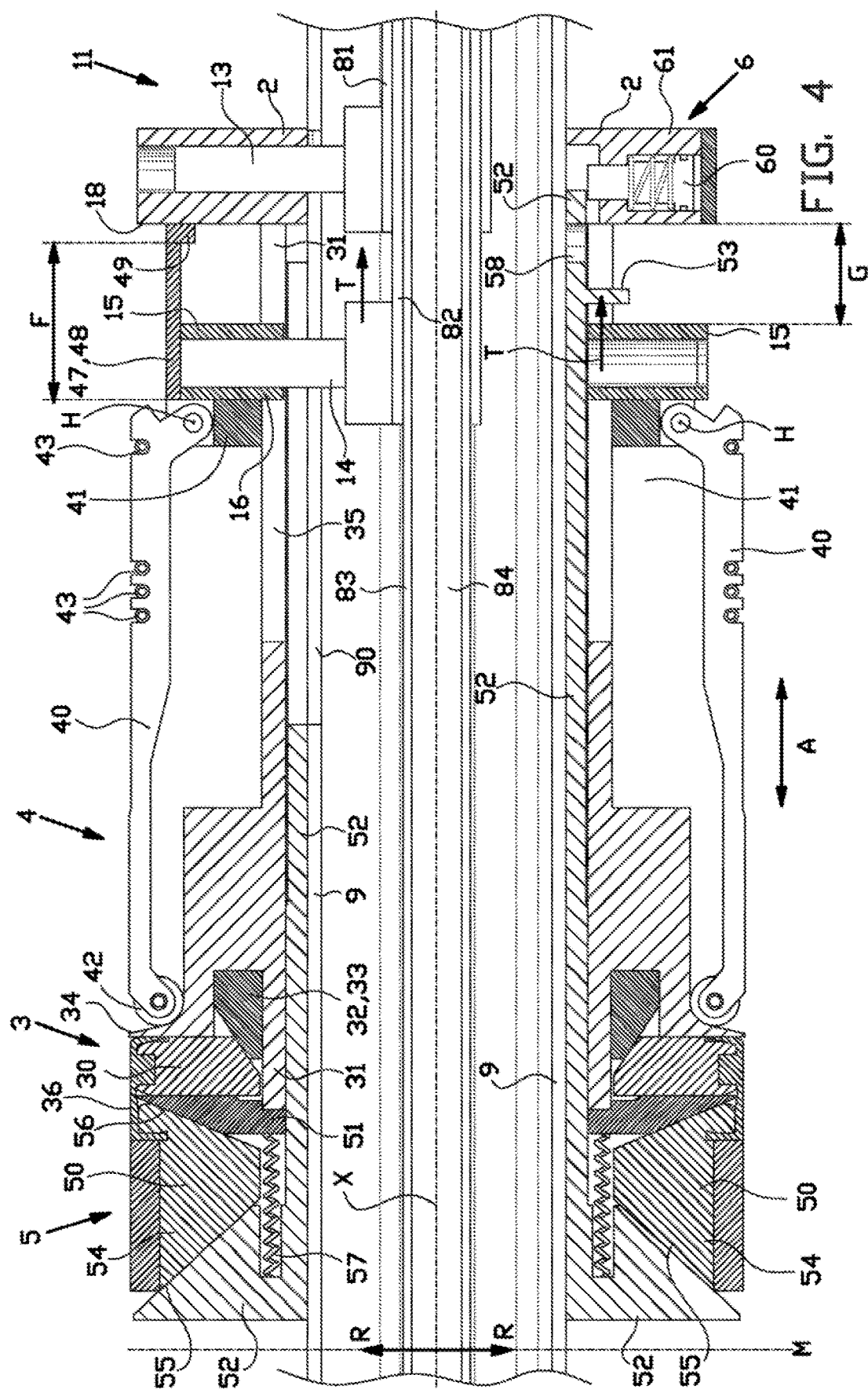
FIG. 4 shows a cross section of the tire building machine according to line IV-IV in FIG. 1.

As best seen in FIG. 4, the first drum half 11 comprises a cylindrical base 2 for mounting the first drum half 11 concentrically to the drum shaft 9. The base 2 defines or has a central axis that is arranged to coincide with the rotation axis X. Hence, the central axis and the rotation axis X are both referred to hereafter with reference sign X. The base 2 is arranged to be movable over the drum shaft 9 in the axial direction A parallel to said central axis X. The base 2 is fixed with respect to the drum shaft 9 in the rotational direction about the central axis X so as to rotate together with the drum shaft 9 when the drum shaft 9 is rotated. The tire building drum 1 is provided with a first coupling member 13 for coupling the first drive member 81 to the base 2. Hence, through control of the drive system 8 in FIG. 9, the base 2 can be move back and forth in the axial direction A in a controlled and accurate manner.

The first drum half 11 comprises a bead-lock section 3 and a turn-up section 4 at a side of the bead-lock section 3 facing away from the center M of the tire building drum 1. The bead-lock section 3 is arranged for receiving and locking a bead of a green tire on the tire building drum 1 prior to shaping the layers of the green tire. The turn-up section 4 is arranged for turning-up parts of the layers located in the axial direction A outside of said bead-lock section 3 with respect to the center M of the tire building drum 1 around the bead at the bead-lock section 3 and against the part of the layers at the inside of the bead-lock section 3 with respect to the center M of the tire building drum 1. The tire building drum 1 according to the present invention distinguishes itself from the tire building drum as disclosed in WO 2011/019280 A1 in that it further comprises a shoulder section or a crown-up section 5 that is located in the axial direction A between the bead-lock section 3 and center M of the tire building drum 1. The crown-up section 5 is arranged for expanding the tire layers supported on the tire building drum 1 in the radial direction R with respect to the bead-lock section 3.

Figure 10A:
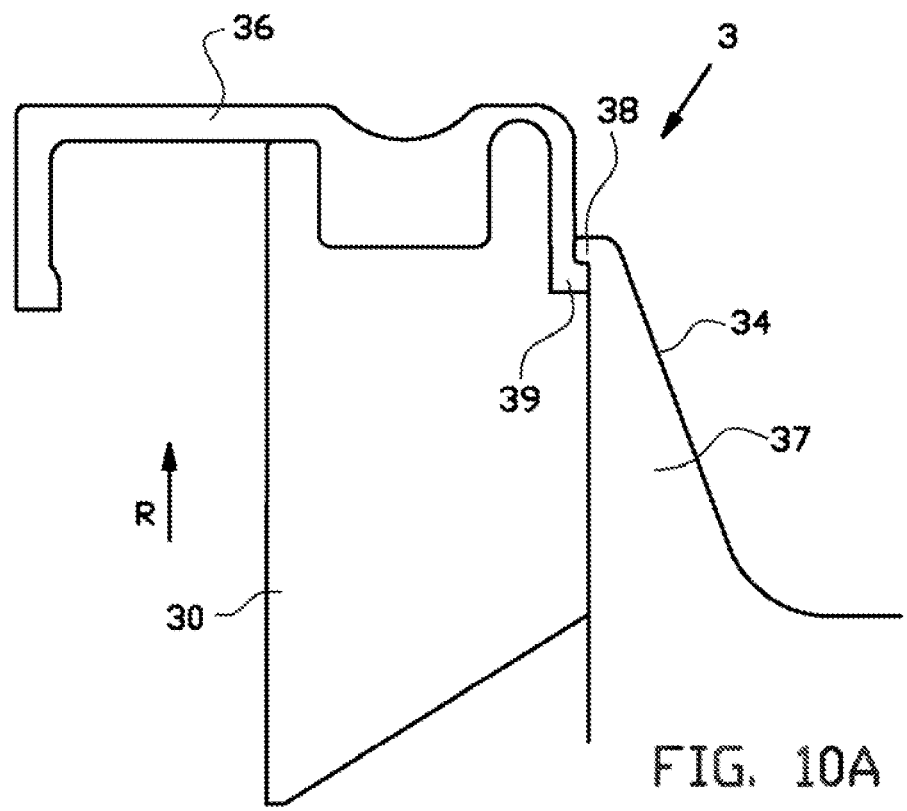
FIGS. 10A and 10B shows details of the operation of a bead-lock member of the tire building drum in the crown-down position of FIG. 1 and the crown-up position of FIG. 2, respectively.
Figure 10B:
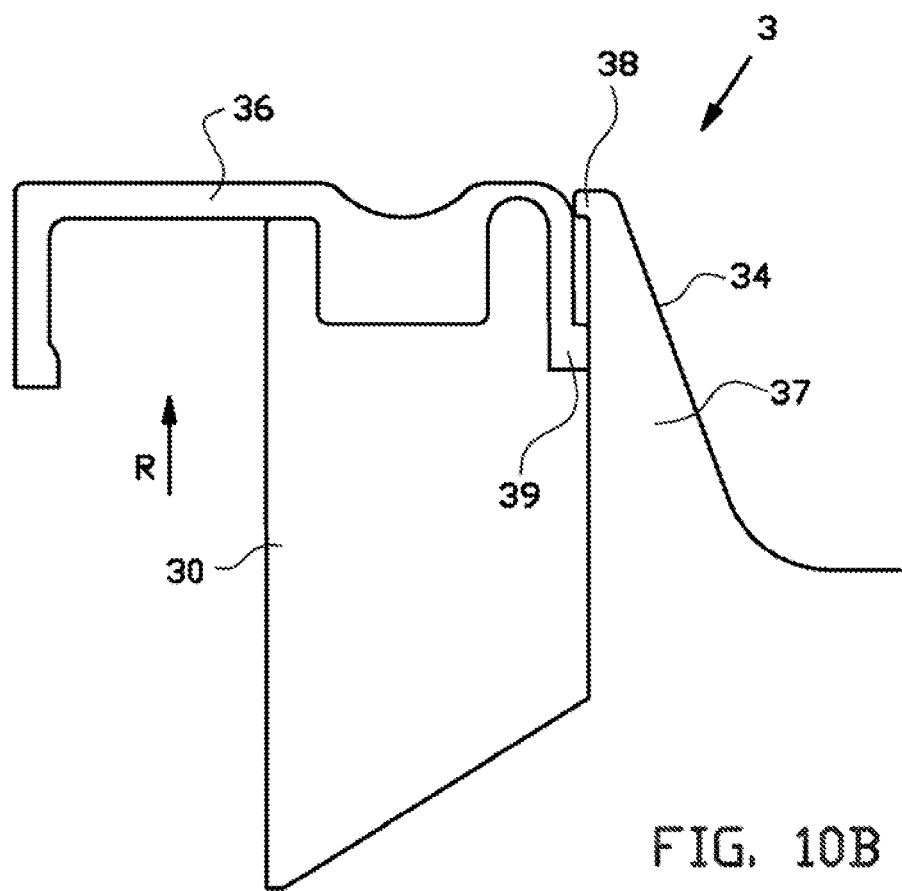

As shown in FIG. 4, the bead-lock section 3 comprises a plurality of bead-lock members 30 distributed circumferentially about the central axis X, a bead-lock support 31 for supporting the bead-lock members 30 with respect to the base 2 and a bead-lock drive 32 for moving the plurality of bead-lock members 30 with respect to the bead-lock support 31 in the radial direction R between a lock position, as shown in FIG. 10A, and a release position, as shown in FIG. 10B. The bead-lock support 31 is connected and/or fixed to the base 2 in the axial direction A for moving the bead-lock section 3 together with the base 2 towards and away from the center M of the tire building drum 1, e.g. during the crown-up or shaping. The bead-lock drive 32 comprises a plurality of bead-lock wedges 33 that are arranged to be driven underneath the plurality of bead-lock members 30 to force said bead-lock members 30 outwards in the radial direction R. The bead-lock wedges 33 can be driven pneumatically in a manner known per se.

Figure 6:
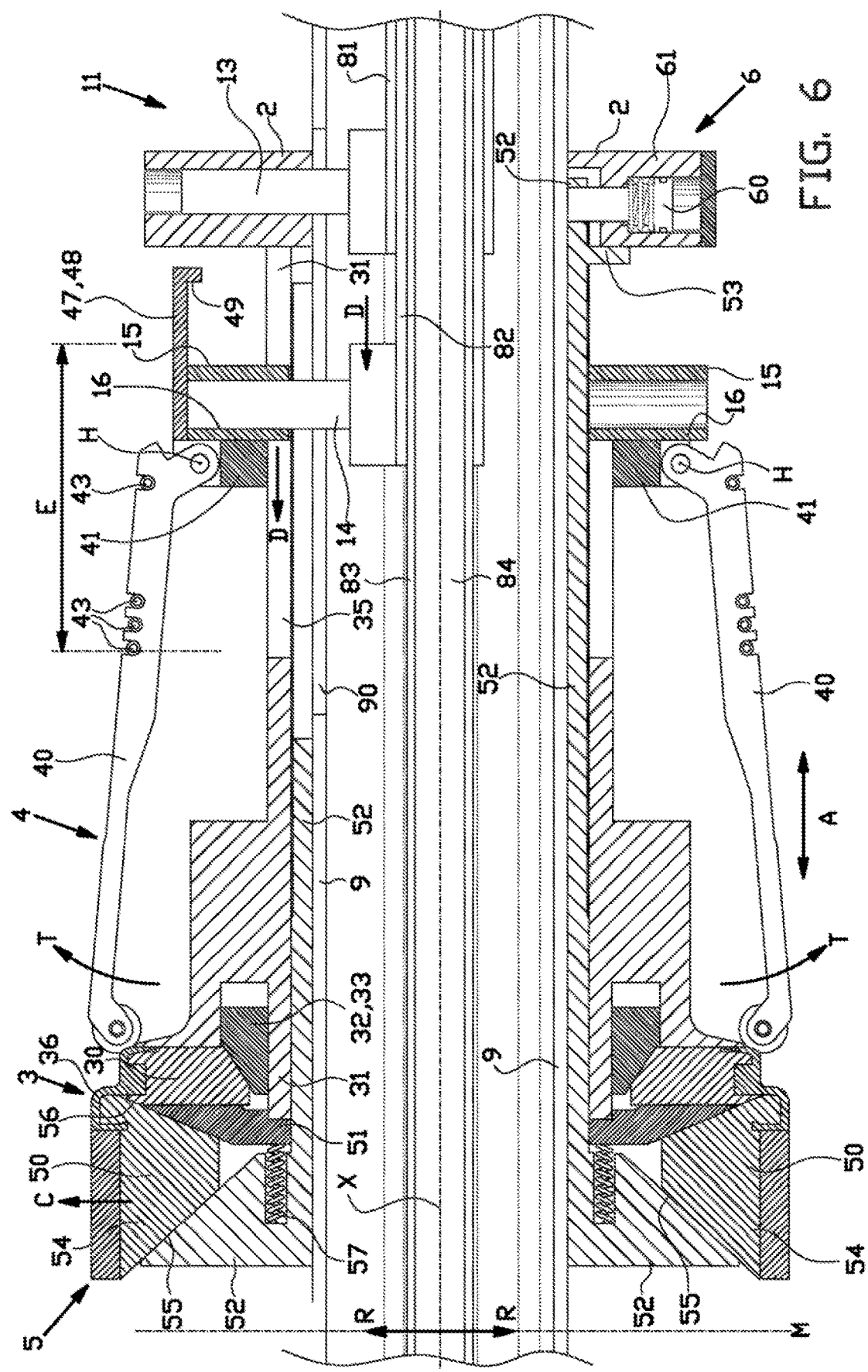
FIGS. 6 and 7 show cross sections of the tire building machine according to FIG. 5 during the subsequent steps of a turn-up operation.
Figure 7:
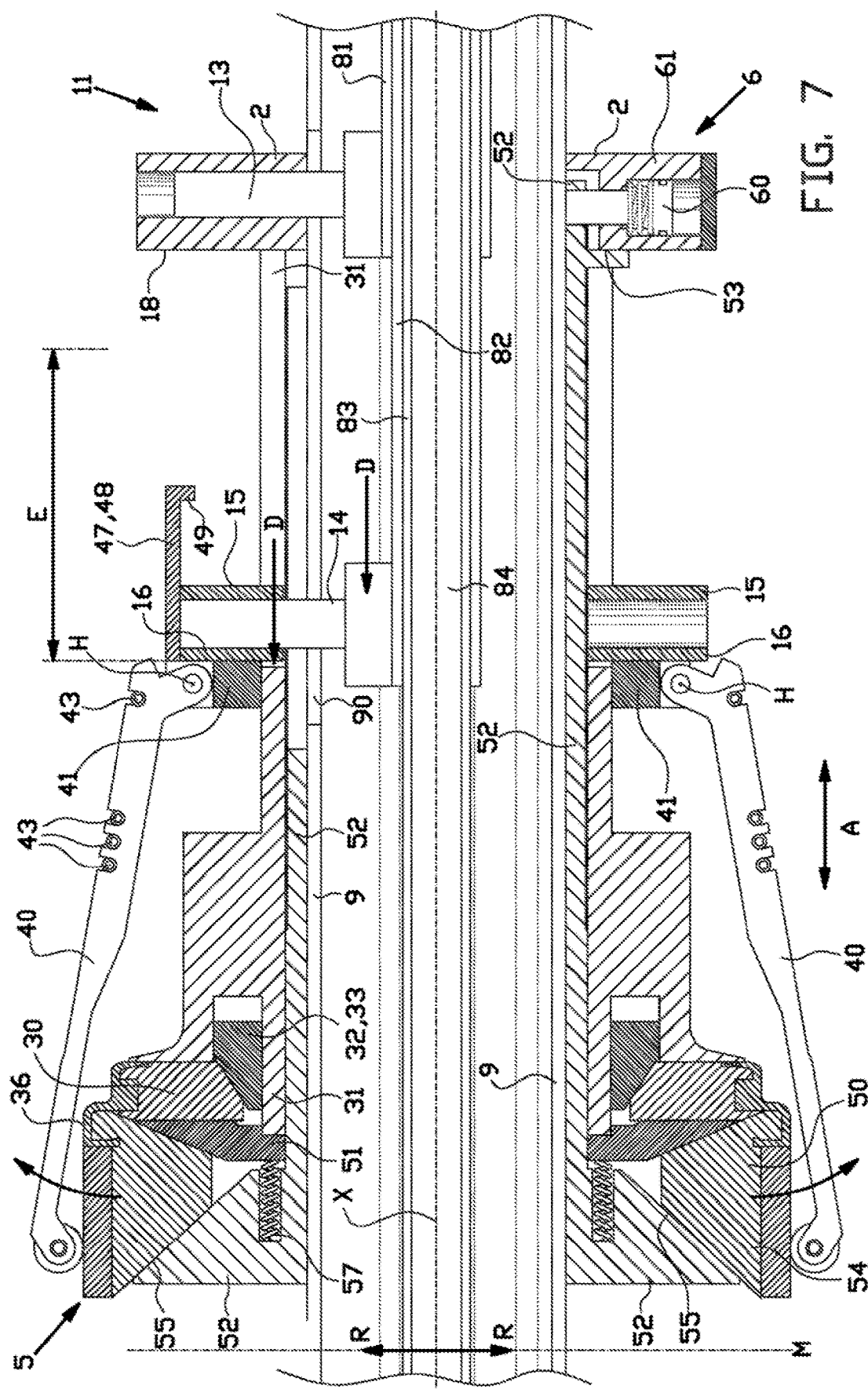
Figure 8:
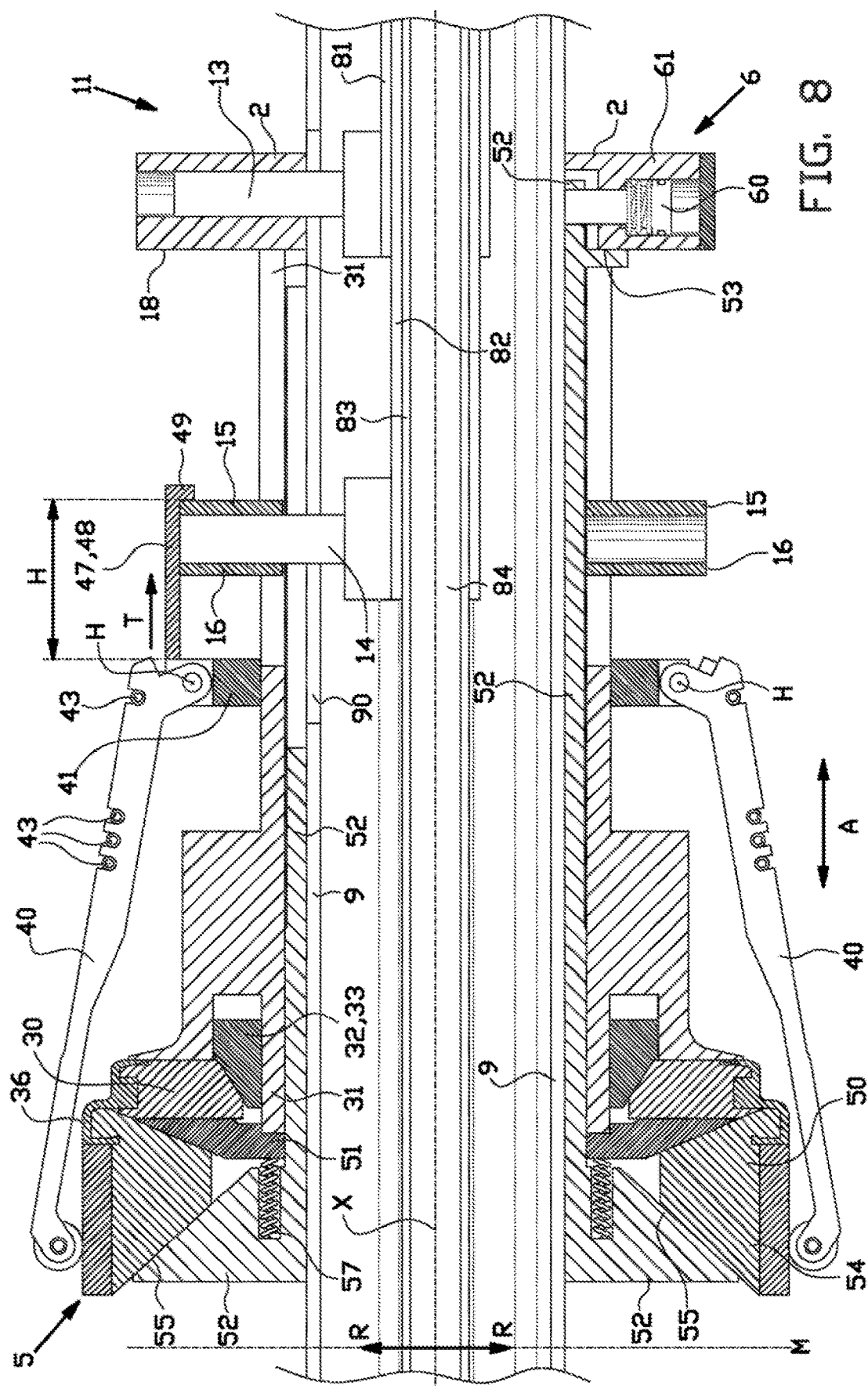
FIG. 8 shows a cross section of the tire building machine according to FIG. 5 during a return step following to the turn-up operation.

As shown in FIGS. 1, 2 and 3, the turn-up section 4 comprises a plurality of turn-up arms 40 distributed circumferentially about said central axis X and an arm support 41 for supporting said turn-up arms 40 with respect to the base 2. The turn-up arms 40 are hingable, swivable or rotatable in respective radial planes with respect to the arm support 41 about hinge axes H perpendicular to each respective radial plane between an arms-down position, as shown in FIG. 4, and arms-up positions, as shown in FIG. 7, for turning-up the part of the tire layers outside of the bead-lock section 3 with respect to the center M of the tire building drum 1. In this exemplary embodiment, each turn-up arm 40 is provided with a turn-up roller 42 at the distal end with respect to the arm support 41, for contacting and rolling over the turned-up parts of the tire layer. The turn-up section 4 further comprises one or more biasing members 43 for biasing the turn-up arms 40 from the arms-up position to the arms-down position. In this exemplary embodiment, the one or more biasing members 43 are provided in the form of annular springs extending circumferentially around the turn-up arms 40. In FIG. 6, the turn-up arms 40 are shown in an optional intermediate position for supporting one or more layers of the green tire during their application on the circumferential surface 10 of the tire building drum 1. Said intermediate position may also be used to provide additional support for tire layers and/or the bead at the bead-lock member 30 in the axial direction A in case of high-pressure inflation of said tire layers, e.g. for truck tires. In the intermediate position, the turn-up arms 40 are arranged for supporting the tire layers at or near the diameter of the circumferential surface 10 of the tire building drum 1 at the crown-up section 5.

As shown in FIGS. 4, 6 and 7, the arm support 41 is movable and/or slidable with respect to said base 2 over a turn-up stroke E in an arm drive direction D parallel to the axial direction A towards the center M of the tire building drum 1. The bead-lock section 3 comprises a run-on surface 34 for guiding and/or deflecting the turn-up arms 40 from a movement in the axial direction A together with the arm support 41 into the upward rotation required to go from the arms-down position to the arms-up position. As a result, when the arm support 41 is moved in the arm drive direction D towards the bead-lock section 3, the turn-up arms 40, and in particular the turn-up rollers 42 thereof, in response are moved onto, up and over the run-on surface 34 towards the arms-up position as shown in FIG. 7.

The first drum half 11 comprises a displacement member 15 for displacing said arm support 41 in both the arm drive direction D and a crown drive direction T opposite to said arm drive direction D. In this exemplary embodiment, both the arm support 41 and the displacement member 15 are slidably supported on the bead-lock support 31. The displacement member 15 is provided with an arm drive surface 16 that faces in the arm drive direction D towards the arm support 41 for contacting and for displacing said arm support 41 in the arm drive direction D through said contact. The tire building drum 1 is provided with a second coupling member 14 for coupling the second drive member 82 to the displacement member 15. Hence, through control of the drive system 8 in FIG. 9, the displacement member 15 can be move back and forth in the axial direction A for moving the arm support 41 in a controlled and accurate manner. The drum shaft 9 and the bead-lock support 31 are provided with respective slots 90, 35 extending in the axial direction A at the position of the second coupling member 14 to allow the coupling of said second coupling member 14 inside the drum shaft 9 to the displacement member 15 at the bead-lock support 31. The slots 90, 35 extend over the length of the turn-up stroke E in the axial direction A to facilitate a full turn-up of the turn-up arms 40 into the arms-up position as shown in FIG. 7.

The turn-up section 4 further comprises a return member 47, e.g. a return rod, that extends from the arm support 41 in the crown drive direction T away from the center M of the tire building drum 1. The return member 47 comprises a catch element 48 that is arranged to catch the displacement member 15 during a return motion in the crown drive direction T. The return member 47 defines a return stroke H over which the displacement member 15 can be moved in the crown drive direction T without interacting with the arm support 41. Once, the displacement member 15 moves into contact with the catch element 48, the displacement member 15 starts to displace the arm support 41 in the crown drive direction T, thereby returning the turn-up arms 40 from the arms-up positions to the arms-down position.

Figure 11A:
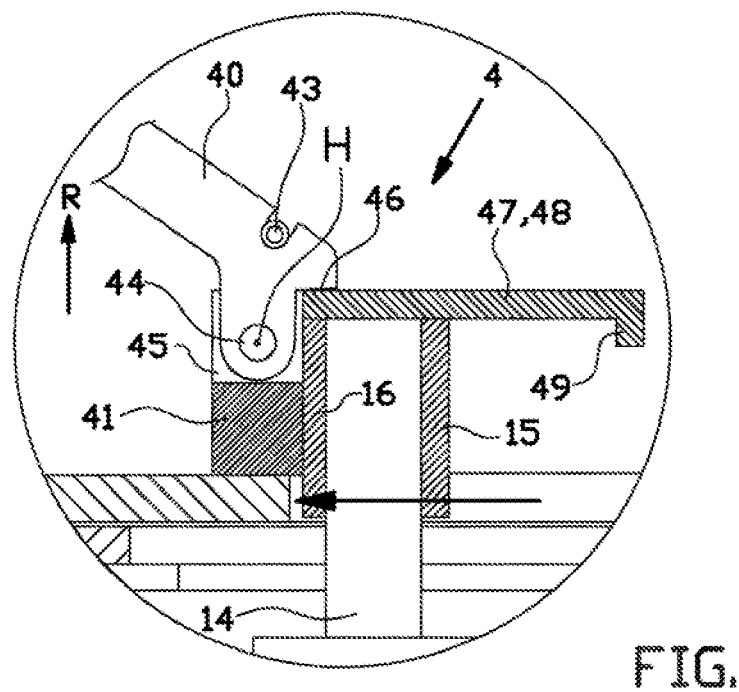
FIGS. 11A and 11B show details of the operation of a turn-up arm of the tire building drum during the turn-up operation as shown in FIGS. 6 and 7.
Figure 11B:
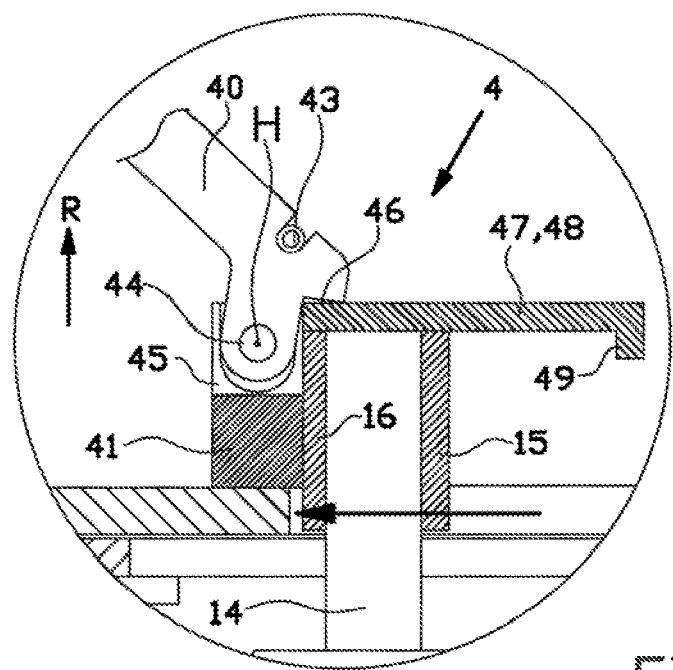

As shown in FIGS. 11A and 11B, each turn-up arm comprises a hinge pin 44 for rotatably coupling the respective turn-up arms 40 to the arm support 41. The arm support 41 comprises a hinge seat 45 for removably receiving the hinge pin 44 of the respective turn-up arm 40. As best seen in FIG. 11B, each hinge seat 45 is provided with a slot for receiving the hinge pin 44 of the respective turn-up arm 40. The turn-up arm 40 is retained with its hinge pin 44 inside the slot by the one or more biasing members 43. Consequently, the hinge pin 44 of the turn-up arm 40 is removable from the hinge seat 45 in the radial direction R by counteracting the bias of the one or more biasing members 43. In some cases, it is desirable to automatically disconnect the turn-up arms 40 from their respective hinge seats 45, for example, when the turn-up arms 40 are rotated radially outwards into an extreme arms-up position that is higher than the normal arms-up position as shown in FIG. 7. To prevent damage to the tire building drum 1 in such an extreme arms-up position, each turn-up arm 40 is provided with a cam surface 46 that is arranged for abutting the displacement member 15 when the turn-up arm 40 are rotated radially outwards beyond the normal arms-up position. More in particular, the cam surface 46 is arranged for lifting the hinge pin 44 of the turn-up arm 40 out of the hinge seat 45, as shown in FIG. 11B.

Figure 5:
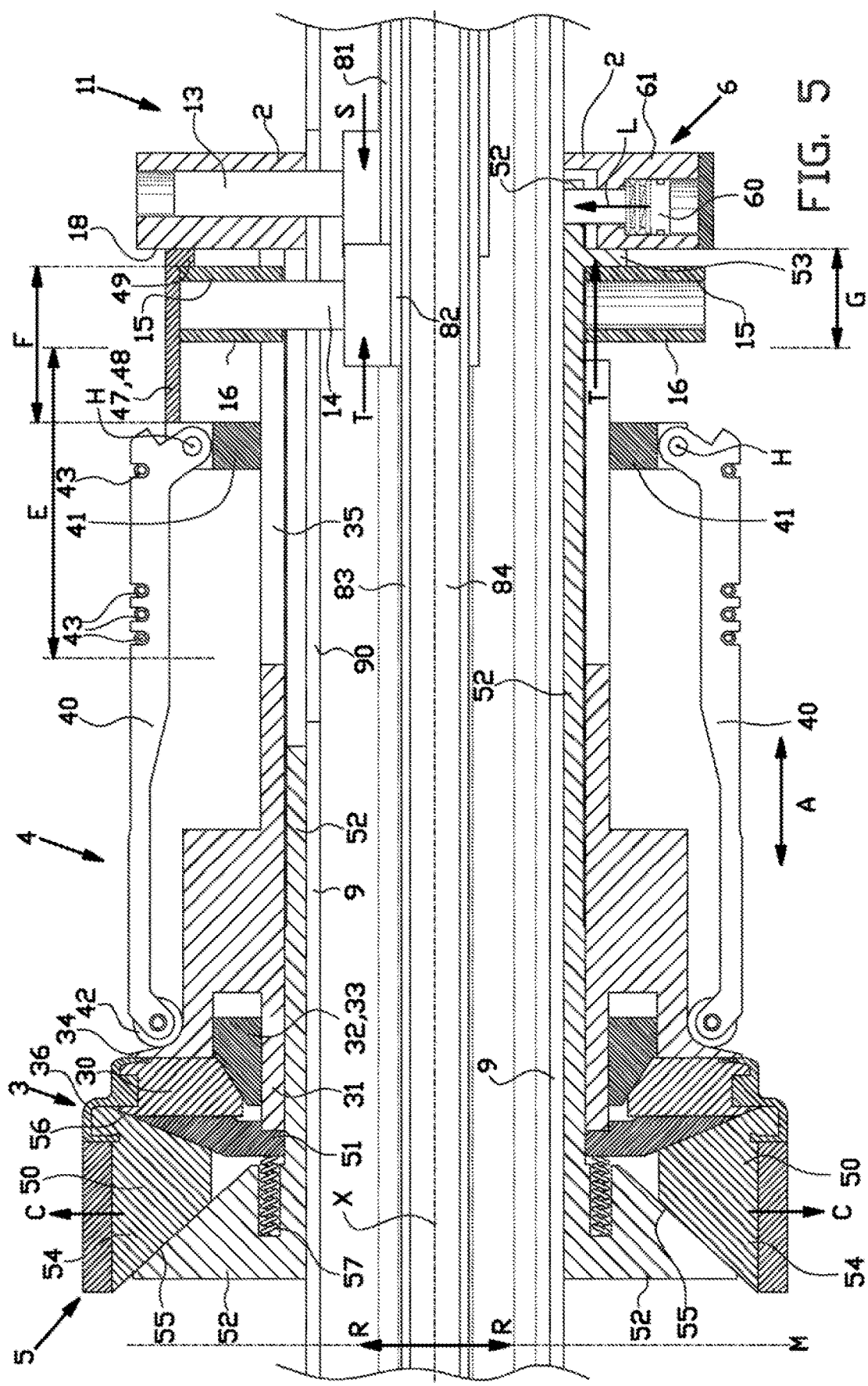
FIG. 5 shows a cross section of the tire building machine according to line V-V in FIG. 3.

As shown in FIGS. 1, 2 and 3, the crown-up section 5 comprises a plurality of shoulder segments or crown segments 50 distributed circumferentially around the base 2 about said central axis X, a crown support 51 for supporting the crown segments 50 with respect to the base 2 and a crown drive 52 for moving the crown segments 50 with respect to the crown support 51 in the radial direction R between a crown-down position, as shown in FIGS. 1 and 4, and a crown-up position, as shown in FIGS. 2 and 5. In this exemplary embodiment, as shown in FIGS. 4 and 5, the crown support 51 is fixed to the bead-lock support 31 while the crown drive 52 is movable with respect to said bead-lock support 31 over a crown-up stroke G parallel to the axial direction A in the direction of the center M of the tire building drum 1. The crown drive 52 and the crown support 51 cooperate to convert the movement of the crown drive 52 over the crown-up stroke G in the axial direction A into a crown-up movement of the crown segments 50 in a crown-up direction C parallel to the radial direction R.

In this particular embodiment, each crown segment 50 is formed as a wedge 54 that is supported between a complementary shaped first drive surface 55 at the crown drive 52 and a second drive surface 56 at the crown support 51, wherein the first drive surface 55 and the second drive surface 56 are oppositely inclined with respect to each other. By moving the crown drive 52 over the crown-up stroke G in the axial direction A, the intermediate distance between the respective oppositely inclined drive surfaces 55, 56 can be reduced, thereby driving and/or forcing the wedge 54 of the crown segment 50 upwards in the crown-up direction C. The crown-up section 5 further comprises a biasing member 57, e.g. a compressible spring, that is arranged between the crown drive 52 and the crown support 51 for biasing the crown drive 52 away from the crown support 51 in the axial direction A to facilitate the return of the crown drive 52 to its original position, thereby allowing the crown segments 50 to return from the crown-up position to the crown-down position.

As best seen in FIGS. 4 and 5, the displacement member 15 is arranged for displacing the crown drive 52 over the crown-up stroke G in the crown drive direction T. In particular, the displacement member 15 is provided with a crown drive surface 17 facing in the crown drive direction T and the crown drive 52 is provided with an abutment member 53 that is in the way of the crown drive surface 17 in the crown drive direction T. Once the crown drive surface 17 and the abutment member 53 are in contact, the displacement member 15 and the crown drive 52 are displaceable together in the crown drive direction T through said contact. The turn-up section 4 is provided with a spacing member 49, e.g. a spacing rod, that extends from one of the arm support 41 and the base 2 in the axial direction A towards a stop surface 18 on the other of the arm support 41 and the base 2. When the spacing member 49 contacts the stop surface 18, the arm support 41 is stopped and can not be moved further in the crown drive direction T. The spacing member 49 serves to keep a distance clear and/or free between the arm support 41 and the stop surface 18, over which distance the displacement member 15 can be moved in a free stroke F to facilitate the crown-up stroke G without the displacement member 15 interacting with the arm support 41. The free stroke F defined by the spacing member 49 is preferably equal to or larger than the return stroke H as defined by the return member 47.

Preferably, the spacing member 49 and the return member 47 are the same member, as shown in FIGS. 4-8.

As shown in FIG. 4, the tire building drum 1 further comprises a locking device 6 with a locking member 60, a locking holder 61 for holding the locking member 60 and a locking drive 62 for moving the locking member 60 with respect to the locking holder 61 between a locking position and a release for locking and releasing, respectively, of the crown drive 52 with respect to the base 2 and/or the bead-lock support 31. The locking holder 61 is fixedly attached to the base 2 and/or the bead-lock support 31. When the locking member 60 is in the locked position, the locking member 60 is arranged to engage the crown drive 52 to lock said crown drive 52 with respect to the bead-lock support 31 in the axial direction A. In the locking position of the locking member 60, the crown drive 52 can thus be moved together with said bead-lock support in the axial direction A, e.g. during shaping operations. As the crown drive 52 is locked with respect to the bead-lock support 31 and the crown support 51 was already fixed to the bead-lock support 31, the intermediate distance between the crown drive 52 and the crown support in the axial direction A is fixed. Hence, the crown segments 50 are held in place and/or fixed in the radial direction R in their respective crown-up positions.

In this exemplary embodiment, the stop surface 18 is provided at the arm support 41 and faces in the crown drive direction T. The spacing member 49 extends from the locking holder 61 towards the stop surface 18 of the arm support 41. Hence, the return of the arm support 41 in the crown drive direction T is stopped when the spacing member 47 contacts the stop surface 18 at the arm support 41.

In this exemplary embodiment, the locking member 60 is a locking pin 60 and the locking holder 61 is a locking channel 61 for slidably receiving the locking member 60. The locking pin 60 is slidable in a locking direction L out of a locking channel 61. Preferably, the locking channel 61 is sealed in an air-tight manner at one end to allow for at least a part of the locking channel 61 to be pressurized. Hence, the locking drive 62 can be a source of pressurized air for pneumatically driving the locking member 60 out of the locking channel 61 towards and into engagement with the crown drive 52. The locking device 6 further comprises a biasing member 63, e.g. a spring, that is arranged for biasing the locking pin 60 towards the release position when the pressure in the locking channel 61 is reduced.

As shown in FIG. 4, the locking device 6 is provided at or near the end of the crown-up stroke G in the crown drive direction T, e.g. at or near the same axial position as the first coupling member 13. In this particular example, the crown drive 52 extends from the crown segments 50 at one side of the displacement member 15 up to the locking device 6 at the opposite side of the displacement member 15. Preferably, the crown drive 52 comprises a locking aperture 58 that is arranged to be out of line with the locking channel 61 when the crown drive 52 is at the start of the crown-up stroke G, as shown in FIG. 4, and to be aligned with the locking channel 61 when the crown drive 52 is at the end of the crown-up stroke 61, as shown in FIG. 5. The locking pin 60 is arranged to engage said locking aperture 58, thereby retaining the crown drive 52 to the locking holder 61.

Figure 12B:
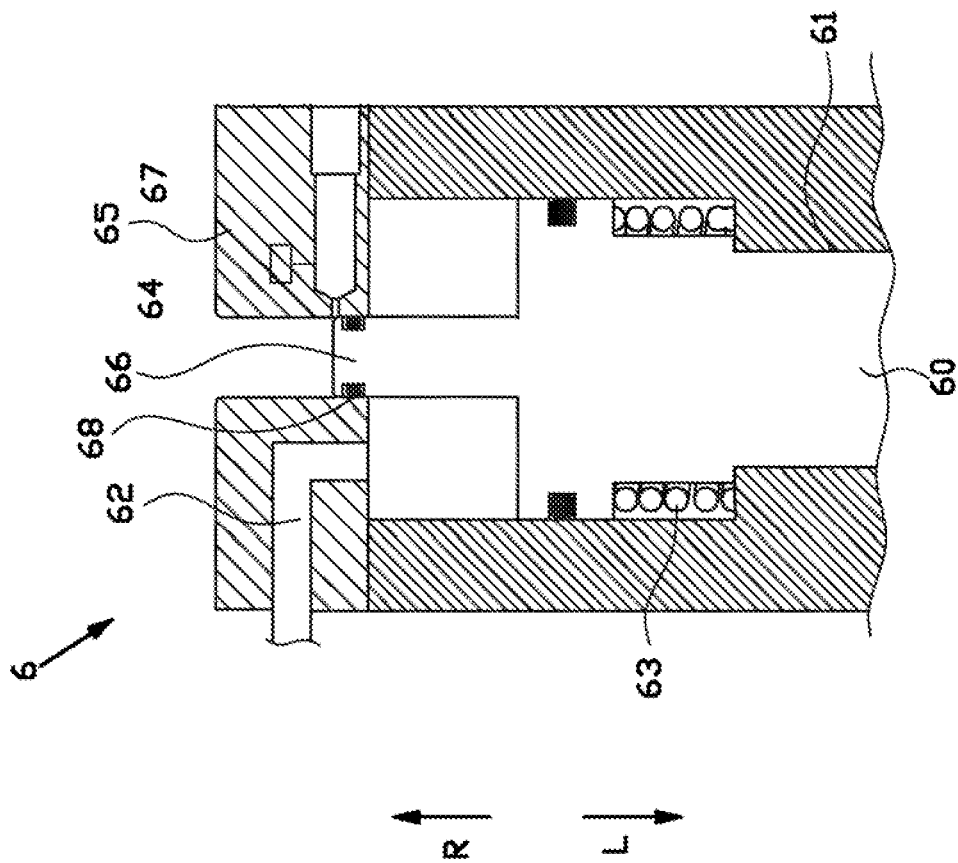
FIGS. 12A and 12B show details of the operation of a locking pin of the tire building drum in the crown-down position of FIG. 1 and the crown-up position of FIG. 2, respectively.
Figure 12A:
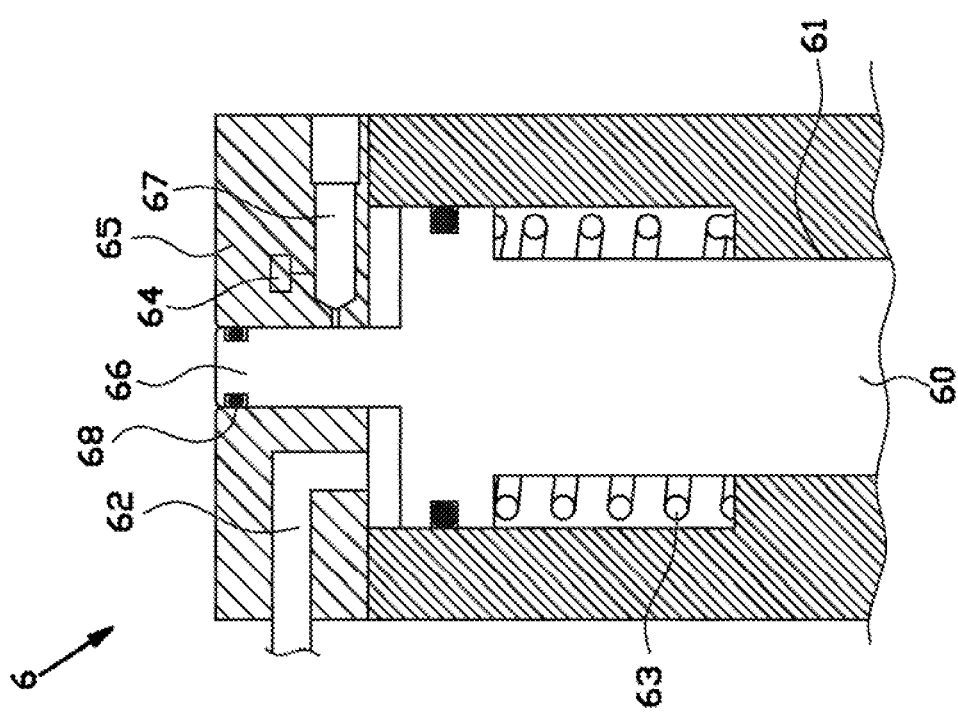

As shown in FIGS. 12A and 12B, the locking device 6 is provided with a sensor 64 for sensing the position of the locking member 60. In the embodiment of the locking pin 60, the sensor 64 is arranged for sensing the position of the locking member 60 based on air-flow. To that end, it can be observed in FIGS. 12A and 12B that the locking device 6 is provided with cover 65 that seals the locking channel 61 and a pilot shaft 66 extending through the cover 61 in the radial direction R and connected to the locking pin 60 so as to be movable together with the locking pin 60 in the locking direction L. The sensor 64 is preferably located in fluid communication with the air-flow that drives the locking pin 60. The pilot shaft 66 is provided with an annular seal 68 that, in the release position of the locking pin 60, is located above the air chamber 67 and the locking channel 61 and that, in the locking position of the locking pin 60, is located between the locking channel 61 and the air chamber 67. The pilot shaft 66 is fitted inside the cover 61 with some positive tolerance so that air can pass from the locking channel 61 along the pilot shaft 66 into the air chamber 67. As a result, an air flow can be detected as long as the annular seal 68 does not block the path of the air flow, thus indicating the release position as shown in FIG. 12A. When the path of the air flow is blocked by the annular seal 68, the air flow is interrupted, which is indicative of the locking pin 60 being in the locking position, as shown in FIG. 12B.

As shown in FIGS. 10A and 10B, the bead-lock section 3 preferably comprises a bead-lock seal 36 in the form of a flexible sleeve which is arranged to extend over and seal the plurality of bead-lock members 30 in an air-tight or substantially air-tight manner. Hence, the bead-lock seal 36 comprises a first end that is arranged to be mounted in an air-tight or substantially air-tight manner to the crown-up section 5 and a second end that is arranged to be mounted in an air-tight or substantially air-tight manner to the first drum half 11 at a side of the bead-lock member 30 opposite to the crown-up section 5. In particular, the second end of the bead-lock seal 36 is arranged to be interposed between the bead-lock member 30 and a mounting body 37 directly adjacent to the bead-lock member 30. In this exemplary embodiment, the mounting body 37 comprises and/or defines the run-on surface 34 for the turn-up arms 40.

Either the mounting body 37, the bead-lock member 30 or both are at least partially spaced apart to receive the second end of the bead-lock seal 36 therein between. When the bead-lock member 30 is moved radially outwards into the bead-lock position as shown in FIG. 10A, the bead-lock seal 36 will slide along the mounting body 37 while maintaining the air-tight or substantially air-tight seal. To prevent the bead-lock seal 36 from unintentionally moving out of abutment with the mounting body 37, the mounting body 37 is preferably provided with a ridge 38 at its radially outer side to retain the bead-lock seal 36 in the radial direction R. More preferably, the bead-lock seal 36 itself is provided with a flange 39 that faces towards the ridge 38 in the radial direction R and that is arranged to hook behind and/or engage said ridge 38 to prevent the bead-lock seal 36 from passing the ridge 38 when air pressure is exerted on the bead-lock seal 36 during a shaping operation.

The method for operating the aforementioned tire building machine 7 will be described hereafter with reference to FIGS. 1-9.

FIGS. 1 and 4 shows the situation in which the tire building drum 1 of the tire building machine 7 is in a flat starting position. The bead-lock members 30 are in the release position, the turn-up arms 40 are in the arms-down position and the crown-segments 50 are in the crown-down position. The tire building drum 1 is now ready for receiving one or more tire components, in particular carcass plies, around its circumferential surface 10. Two beads are provided around said one or more tire components at the location of the bead-lock sections 3. Once, the one or more tire components are received, the bead-lock members 30 are caused to move radially outwards into the bead-lock position, as shown in FIG. 5, to seal the one or more tire components against said beads. Shortly thereafter, the first drive member 81 and the fourth drive member 84 are operated to move the first coupling members 13 of the respective drum halves 11, 12, and thereby the drum halves 11, 12 as a whole, in the axial direction A towards each other, as shown in FIGS. 2 and 5. Simultaneously, the second drive member 82 and the third drive member 83 are operated to move the second coupling members 14 of the respective drum halves 11, 12 in the axial direction A away from each other in the respective crown drive directions T to cause the crown segments 50 to move in the radial direction R towards the crown-up position. The center deck 70 is lifted synchronously by the crown segments 50 of both drum halves 11, 12 into the crown-up position to support the one or more tire components.

With the crown segments 50 expanded into the crown-up position, the crown drive 52 is locked by the locking device 6 in the manner as previously described, after which the second drive member 82 and the third drive member 83 are operated to move the second coupling members of the respective drum halves 11, 12 in the axial direction A towards each other in the arm drive direction D, as shown in FIGS. 6 and 7, thereby causing a turn-up of the turn-up arms 40 towards and into the arms-up position as shown in FIG. 7. This causes the plies located axially outside the bead-lock sections 3 to be turned up around the beads. Subsequently, the first drive member 81 and the fourth drive member 84 are operated again to move the first coupling members 13 of the respective drum halves 11, 12, and thereby the drum halves 11, 12 as a whole, further in the axial direction A towards each other, as shown in FIG. 3, to allow for a shaping operation, e.g. inflation of the tire components at the center deck 70, to be performed at the center M of the tire building drum 1.

The previously described method is known as a crown carcass building method. Said method involves the turning-up of plies prior to the shaping operation.

The tire building machine 7 according to the invention can optionally also be used to perform an alternative method, known as a flat carcass building method. In said alternative method, the crown segments 50 of the crown-up section 5 are moved in the radial direction R into a shoulder position which is at the same radial distance from the central axis X or lower than the crown-up position. Subsequently, the tire components axially between the bead-lock sections 3 are shaped, e.g. by inflation. In contrast to the previously discussed crown carcass building method, the plies axially outside the bead-lock sections 3 are only turned-up after the shaping operation.

Hence, both methods can be performed on the same tire building machine 7 without interchanging the drum halves 11, 12 of the tire building drum 1. It merely requires controlling the drive system 8 differently so that the drive members 81-84 are operated in a different order.

In this exemplary embodiment, the schematic cross sections in FIGS. 4-8 are presented as in a single cross section plane through the tire building drum 1, as indicated with lines IV-IV and V-V in FIGS. 1 and 3, respectively, for the purpose of showing the many different operational principles of the tire building drum 1 in a single drawing. However, it is noted that parts of the first drum half 1 may be located in different radial planes. The upper half of the cross section above the central axis X and the bottom half of the cross section below the central axis X may for example be cross sections in different radially extending planes of the tire building drum 1, e.g. at an angle of sixty degrees to each other.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a first drum half for together with a second drum half forming a tire building drum of a tire building machine. The invention further relates to said tire building machine and to a method for operating said machine. The machine comprises a first drive member and a second drive member movable in the axial direction inside the drum shaft. The first drum half comprises a base movable over the drum shaft in an axial direction, a crown-up section comprising a plurality of crown segments and a displacement member for displacing the crown segments in a crown-up direction, wherein the first drum half further comprises a first coupling member for coupling the first drive member to the base to drive the movement of the base and a second coupling member for coupling the second drive member to the displacement member to drive the displacement of the crown segments.

The invention claimed is:

1. A turn-up section for a tire building drum, comprising a plurality of turn-up arms distributed circumferentially about a central axis (X) and an arm support configured for supporting said turn-up arms with respect to a base, wherein the turn-up arms are rotatable with respect to the arm support from an arms-down position towards an arms-up position in response to the movement of the arm support in an arm drive direction (D), wherein the arm support comprises a hinge seat configured for removably receiving the respective turn-up arm, wherein the respective turn-up arm is retained in the hinge seat by one or more biasing members, wherein the respective turn-up arm is removable from the hinge seat in a radial direction (R) with respect to the central axis (X) by counteracting the bias of the one or more biasing members, wherein each turn-up arm is provided with a cam surface that is configured for lifting the respective turn-up arm out of the respective hinge seat when the respective turn-up arm is rotated radially outwards beyond the normal arms-up position.

2. The turn-up section according to claim 1, wherein each turn-up arm comprises a hinge pin configured for rotatable coupling the respective turn-up arm to the arm support, wherein the hinge pin is removably received in the hinge seat and retained by the one or more biasing members in said hinge seat, wherein the hinge pin of the respective turn-up arm is removable from the hinge seat in the radial direction (R) by counteracting the bias of the one or more biasing members.

3. The turn-up section according to claim 2, wherein the cam surface is configured for lifting the hinge pin out of the respective hinge seat when the respective turn-up arm is rotated radially outwards beyond the normal arms-up position.

4. A first drum half for together with a second drum half forming a tire building drum, wherein the first drum half comprises the turn-up section comprising a plurality of turn-up arms distributed circumferentially about a central axis (X) and an arm support configured for supporting said turn-up arms with respect to a base, wherein the turn-up arms are rotatable with respect to the arm support from an arms-down position towards an arms-up position in response to the movement of the arm support in an arm drive direction (D), wherein the arm support comprises a hinge seat configured for removably receiving the respective turn-up arm, wherein the respective turn-up arm is retained in the hinge seat by one or more biasing members, wherein the respective turn-up arm is removable from the hinge seat in a radial direction (R) with respect to the central axis (X) by counteracting the bias of the one or more biasing members, wherein each turn-up arm is provided with a cam surface that is configured for lifting the respective turn-up arm out of the respective hinge seat when the respective turnup arm is rotated radially outwards beyond the normal arms-up position.

5. The first drum half according to claim 4, wherein each turn-up arm comprises a hinge pin configured for rotatable coupling the respective turn-up arm to the arm support, wherein the hinge pin is removably received in the hinge seat and retained by the one or more biasing members in said hinge seat, wherein the hinge pin of the respective turn-up arm is removable from the hinge seat in the radial direction (R) by counteracting the bias of the one or more biasing members.

6. The first drum half according to claim 5, wherein the cam surface is configured for lifting the hinge pin out of the respective hinge seat when the respective turn-up arm is rotated radially outwards beyond the normal arms-up position.

* * * * *